Patented Sept. 22, 1931

1,824,018

UNITED STATES PATENT OFFICE

WILLIAM J. HORN, OF BRIDGEPORT, CONNECTICUT, ASSIGNOR, BY MESNE ASSIGNMENTS, TO McKESSON & ROBBINS, INC., OF BRIDGEPORT, CONNECTICUT, A CORPORATION OF CONNECTICUT

MEDICINAL PREPARATION

No Drawing.    Application filed June 30, 1930. Serial No. 465,060.

The present invention is directed generally to a medicinal preparation for the treatment of anemia and/or pernicious anemia and more particularly to such a preparation which is conducive to the regeneration of hemoglobin in the blood. Hemoglobin contains iron as one of its constituent elements. Efforts have heretofore been made to treat anemia and generally to regenerate hemoglobin by the introduction into the system of iron in various forms. It is the object of the present invention to provide a preparation which greatly enhances the iron metabolism or hematopoiesis, increases the hemoglobin content of the blood and thereby provides effective treatment of anemia and/or pernicious anemia.

The preparation, therefore, contains an iron compound, preferably in the form of a proteid, and more particularly an iron nucleinate or iron peptonate, the preparation also containing an addition agent which assists in and probably functions as a catalyst in iron metabolism or in the formation of hemoglobin. More particularly, this addition agent is a suitable copper compound, such as copper proteids, and preferably a copper nucleinate or copper caseinate or a mixture of the same.

The preferred form of the preparation, therefore, contains iron in one or more of the forms set forth above and copper in one or more of the forms set forth above.

I find each of the following preparations effective in the treatment of anemia and/or pernicious anemia:

1. Solution of copper nucleinate and iron nucleinate.
2. Solution of copper nucleinate and iron peptonate.
3. Solution of copper caseinate and iron peptonate.

Of the above preparations, the form which contains both the iron and the copper in the form of nucleinates is preferred. Nucleoproteins generally and nucleic acid particularly play an important rôle in body metabolism. The introduction, therefore, of iron and copper in this form assists greatly in the absorption of these elements into the system and is effective in the formation of the hemoglobin. Moreover, iron and copper compounds generally have astringent and toxic properties whereas masked in the form of organic compounds and particularly in the form of proteids, these undesirable properties are greatly overcome.

The following data are the result of experimental tests upon anemic rats.

For producing anemia in experimental rats I found it quite advantageous to feed the mothers the U. S. P. X. diet plus warm milk made from whole milk powder, but without vegetables or meat during the period of lactation. At the age of twenty-one days the litters were removed and placed on cow's whole milk diet. When treated in this manner the test animals were observed to develop a marked case of anemia in from three to four weeks as evidenced by hemoglobin content of the blood and loss of color in eyes, ears, feet and tails. The average hemoglobin content of the animals at the end of this period is about five grams per one hundred c. c. of blood.

At this point of the test the animals are placed in individual cages and fed daily for six days a week one c. c. of a solution of the compounds investigated in about five c. c. of milk. After consuming this test portion each animal was given about fifty c. c. additional milk daily. Hemoglobin determinations were made weekly by means of a Newcomer hemoglobinometer on the sample of blood taken from the tail of the rat in the usual manner. Weekly weighings were made during the test period.

In Table I are given the average results of hemoglobin determinations and weights of three test animals and three controls. The test animals as shown under chart I received 0.25 mg. copper as nucleinate (29.72 per cent Cu) and 0.50 mg. iron as iron nucleinate (8.89 per cent Fe). These figures show that in one week's time, after the addition of copper and iron, the hemoglobin increased from 6.7 grams per 100 c. c. blood to 14.6 grams.

TABLE I

Average weight and hemoglobin levels of animals receiving 0.25 mg. copper as copper nucleinate (29.72 per cent Cu) and 0.50 mg. iron as iron nucleinate (8.89 per cent Fe).

| | Test animals (3) | | Controls (3) | |
|---|---|---|---|---|
| | Hemoglobin, grams per 100 c. c. blood | Weight, grams | Hemoglobin, grams per 100 c. c. blood | Weight, grams |
| At start | 6.7 | 71 | 6.1 | 76 |
| End of 1 week | 14.6 | 80 | 4.9 | 86 |
| End of 2 weeks | 14.2 | 94 | 4.1 | 96 |
| End of 3 weeks | 15.2 | 103 | 3.9 | 99 |
| End of 4 weeks | 16.3 | 111 | 4.1 | 100 |

Table II contains the average results of hemoglobin determinations and weights of four test rats receiving similar amounts of copper and iron as copper nucleinate (29.72 per cent Cu) and iron peptonate (17.5 per cent Fe).

TABLE II

Average weight and hemoglobin levels of animals receiving 0.25 mg. copper as copper nucleinate (29.72 per cent Cu) and 0.50 mg. iron as iron peptonate (17.5 per cent Fe).

Experimental animals (4)

| | Hemoglobin, grams per 100 c. c. | Weight, grams |
|---|---|---|
| At start | 7.0 | 61 |
| End of 1 week | 13.4 | 71 |
| End of 2 weeks | 13.7 | 81 |
| End of 3 weeks | 14.4 | 89 |

Under Table III are given the average results of hemoglobin determinations and weights of four test animals receiving similar amounts of copper and iron as copper nucleinate (9.82 per cent Cu) and iron peptonate (17.5 per cent Fe).

TABLE III

Average weight and hemoglobin levels of animals receiving 0.25 mg. copper as copper nucleinate (9.82 per cent Cu) and 0.50 mg. iron as iron peptonate (17.5 per cent Fe).

Experimental animals (4)

| | Hemoglobin, grams per 100 c. c. | Weight, grams |
|---|---|---|
| At start | 3.7 | 80 |
| End of 1 week | 9.9 | 84 |
| End of 2 weeks | 13.8 | 104 |
| End of 3 weeks | 14.3 | 133 |

In Tables IV and V are given the average hemoglobin determinations and weights of six test animals receiving 0.25 mgs. of copper as copper caseinate (4.87 per cent Cu) and 0.50 mg. iron as iron peptonate (17.5 per cent Fe).

TABLES IV AND V

Average weight and hemoglobin levels of rats receiving 0.25 mg. copper as copper caseinate (4.87 per cent Cu) and 0.50 mg. iron as iron peptonate (17.5 per cent Fe).

TABLE IV

Experimental animals (2)

| | Hemoglobin, grams per 100 c. c. | Weight, grams |
|---|---|---|
| At start | 3.5 | 99 |
| End of 4 days | 7.6 | 100 |
| End of 11 days | 13.1 | 108 |
| End of 18 days | 14.4 | 108 |

TABLE V

Experimental animals (4)

| | Hemoglobin, grams per 100 c. c. | Weight, grams |
|---|---|---|
| At start | 6.6 | 61 |
| End of 1 week | 12.1 | 72 |
| End of 2 weeks | 12.9 | 78 |
| End of 3 weeks | 14.0 | 85 |

PREPARATION OF COPPER NUCLEINATE FROM YEAST

Copper nucleinate was prepared from dried brewers' yeast by the following method: two hundred grams of yeast were mixed with 1000 c. c. distilled water and stirred during the addition of 10 grams NaOH in concentrated solution. While cooling with ice, about 0.8 of the alkali was neutralized with concentrated HCl (20 grams) and the solution finally made acidic to litmus paper with 30 per cent acetic acid. The residue was allowed to settle over night and the liquid portion filtered through a plaited filter paper. Copper sulphate, C. P. was then added to a concentration of about 4½ per cent and the mixture thoroughly stirred until all copper sulphate was in solution. A light bluish-green flocculant precipitate was immediately formed and was allowed to settle. The supernatant liquid was decanted and the precipitate washed twice with water by decantation. The residue was then filtered by suction on a Büchner funnel and washed thoroughly with distilled water until free of sulphates. The precipitate was then triturated with ninety-five per cent alcohol in a glass mortar, filtered by suction and after washing twice with alcohol, treated in a similar manner with ether. The precipitate was finally dried on filter paper in the air and was obtained in the form of a light bluish-green amorphous powder. Yield of copper nucleinate was 6.24 grams. On analysis this compound was found to contain 29.72 per cent of copper and 10.3 per cent of phosphorus. No sulphate was present when tested in the usual manner.

PREPARATION OF IRON NUCLEINATE FROM YEAST

Iron nucleinate was prepared from brewers' yeast in somewhat the same manner as the copper compound, ferric chloride, C. P. being used in place of copper sulphate. It was necessary, however, to precipitate the iron compound in sixty per cent alcohol owing to the partial solubility of iron nucleinate in water. In washing the precipitate sixty per cent and ninety-five per cent alcohol were used followed by ether as in the case of the copper compound. An amorphous light brown compound was obtained which on analysis contained 8.89 per cent iron and 4.21 per cent phosphorus. Yield from two hundred grams yeast was 7.0 grams.

PREPARATION OF COPPER NUCLEINATE FROM NUCLEIC ACID

Five grams of nucleic acid was added to 300 c. c. of distilled water in an 800 c. c. beaker and NaOH solution added in small amounts with constant stirring until the nucleic acid went into solution. The solution was then slightly acidified with thirty per cent acetic acid and copper sulphate C. P. solution added with stirring until precipitation was complete. A light green flocculent precipitate was immediately formed. On settling the supernatant liquid was decanted. The residue was washed twice by decantation, filtered by suction and washed free of sulphates. It was then triturated with ninety-five per cent alcohol in a glass mortar, filtered and washed with alcohol. This treatment was then repeated with ether. A light green amorphous powder was obtained containing 9.82 per cent of copper and 7.05 per cent of phosphorus. Yield 5.08 grams.

PREPARATION OF COPPER CASEINATE FROM CASEIN

One hundred grams of purified casein was added to 1500 c. c. distilled water and, while stirring, about 119 c. c. of normal NaOH added in portions until the casein was completely dissolved. Copper sulphate, twenty-one grams in 120 c. c. water, was then added while stirring until precipitation was complete. The copper caseinate which separated as a green flocculant precipitate was then filtered by suction and washed with water until free of sulphates. After washing with fifty per cent alcohol, ninety-five per cent alcohol and ether, the residue was dried on filter paper in the air. A bluish-green crystalline powder was obtained containing 4.87 per cent of copper. Yield 101 grams.

The iron peptonate used in these tests was Merck's N. F. V. powder and contained 17.5 per cent of iron.

It will be seen from the above that solutions of the iron and copper compounds constitute an effective treatment of all cases of anemia. These preparations can be made up in liquid form which are exceedingly palatable and the required daily dosage is small. The cost per daily dose is comparatively low. A positive reaction in the regeneration of hemoglobin is obtained.

The following tabulations give the specific compositions of the solutions used in the experiments that are tabulated hereinabove:

SOLUTION OF COPPER NUCLEINATE AND IRON NUCLEINATE

Copper nucleinate (made from brewers' yeast, 29.72% copper).
Iron nucleinate (made from brewers' yeast 8.89% iron).
Solution made up so that 1 c. c. contains:
0.25 mg. copper or 0.842 mg. copper nucleinate (29.72% copper).
0.50 mg. iron or 5.6 mgs. iron nucleinate (8.89% iron).
8.00 mgs. sodium citrate (U. S. P. IX, Merck).

*Formula used (500 c. c. solution)*

0.421 grams copper nucleinate.
2.800 grams iron nucleinate.
4.000 grams sodium citrate.
72.00 c. c. alcohol.
24.00 c. c. sugar syrup. (85:100 $H_2O$).
24.00 c. c. glycerin.
0.08 c. c. oil of orange (sweet-italian).
0.08 c. c. acetic ether (ethyl acetate, anhyd.).
0.01 gram vanillin.
Distilled water to make 500 c. c. solution.

*Note.*—Four (4) teaspoonfuls (4 c. c. each) of the above copper-iron solution should contain 4.0 mgs. copper and 8.0 mgs. iron.

One ounce of this solution contains:
0.026 gram copper nucleinate.
0.168 gram iron nucleinate.
One ounce contains about 30 c. c. or 7½ teaspoonfuls.

SOLUTION OF COPPER NUCLEINATE AND IRON PEPTONATE

Copper nucleinate (made from brewers' yeast 29.72% copper).

Iron peptonate (Merck, N. F. V.-powder, 17.5% iron).

Solution made up so that 1 c. c. contains:
0.25 mg. copper or 0.842 mg. copper nucleinate (29.72% copper).
0.50 mg. iron or 2.85 mgs. iron peptonate (17.5% iron).
8.00 mgs. sodium citrate (U. S. P. IX, Merck).

*Formula used (500 c. c. solution)*

0.421 gram copper nucleinate.
1.425 grams iron peptonate.
4.000 grams sodium citrate.
72.00 c. c. alcohol.
24.00 c. c. sugar syrup (85:100 $H_2O$).
24.00 c. c. glycerin.
0.08 c. c. oil of orange (sweet-italian).
0.08 c. c. acetic ether (ethyl acetate, anhyd.).
0.01 gram vanillin.
Distilled water to make 500 c. c. solution.

*Note.*—Four (4) teaspoonfuls of the above copper-iron solution should contain 4.0 mgs. copper and 8.0 mgs. iron.

One ounce of this solution contains:
0.025 gram copper nucleinate.
0.085 gram iron peptonate.
One ounce contains about 30 c. c. or 7½ teaspoonfuls.

SOLUTION OF COPPER CASEINATE AND IRON PEPTONATE

Copper caseinate (made from purified casein 4.87% copper).
Iron peptonate (Merck, N. F. V.-powder 17.5% iron).
Solution made up so that 1 c. c. contains:
0.25 mg. copper or 5.13 mgs. copper caseinate (4.87% copper).
0.50 mg. iron or 2.85 mgs. iron peptonate (17.5% iron).
8.00 mgs. sodium citrate (U. S. P. IX, Merck).

*Formula used (500 c. c. solution)*

2.565 grams copper caseinate.
1.425 grams iron peptonate.
4.000 grams sodium citrate.
72.00 c. c. alcohol.
24.00 c. c. sugar syrup (85:100 $H_2O$).
24.00 c. c. glycerin.
0.08 c. c. oil of orange (sweet-italian).
0.08 c. c. acetic ether (ethyl acetate, anhyd.).
0.01 gram vanillin.
Distilled water to make 500 c. c. solution.

*Note.*—Four (4) teaspoonfuls of the above copper-iron solution should contain 4.0 mgs. copper and 8.0 mgs. iron.

One ounce of this solution contains:
0.154 gram copper caseinate.
0.085 gram iron peptonate.
One ounce contains about 30 c. c. or 7½ teaspoonfuls.

Similar preparations for the treatment of humans preferably contain different proportions of the several ingredients. The following tabulations show the preferred compositions. It will be understood, however, that these compositions are submitted herewith only for illustrative purposes and that the specific proportions of the several ingredients may be varied widely, and some of these may be entirely omitted. The essential feature of these preparations is that they contain iron and copper in suitable forms, the iron serving to enter into the bodily metabolism for the regeneration of hemoglobin, the copper having apparently only a catalytic function.

SOLUTION OF COPPER NUCLEINATE AND IRON NUCLEINATE

*Formula (1000 c. c. solution)*

| | |
|---|---|
| Copper nucleinate (29.72% copper) | 0.421 gram |
| Iron nucleinate (8.89% iron) | 11.424 grams |
| Sodium citrate | 9.000 grams |
| Alcohol | 150.000 c. c. |
| Sugar | 42.500 grams |
| Glycerin | 50.000 c. c. |
| Oil of orange (sweet-italian) | 0.160 c. c. |
| Acetic ether (ethyl acetate, U. S. P.) | 0.160 c. c. |
| Vanillin | 0.020 gram |
| Distilled water to make | 1000.000 c. c. |

Alcoholic strength above solution, 14.25% (theoretical).

Maximum dose: metric, 8 c. c.—Apothecaries, 2 fluidrachms.

One maximum dose contains about:
0.001 grams copper or 0.0033 grams copper nucleinate.
0.008 grams iron or 0.0913 grams iron nucleinate.

Daily dosage recommended:
From 1 to 2 teaspoonfuls, in a wine-glassful of milk three times daily just before meals.

PROCEDURE FOR MAKING SOLUTION

1. Dissolve the copper nucleinate and sodium citrate in 500 c. c. distilled water by vigorous stirring. When copper is in solution add the iron nucleinate and stir until dissolved.

2. Dissolve the vanillin, oil of orange and acetic ether in the alcohol and add this solution to the first with stirring.

3. Add the glycerin and sugar and stir until dissolved.

4. Make up to the proper volume with distilled water.

Solution of copper nucleinite and iron peptonate

Formula (1000 c. c. solution)

| | |
|---|---|
| Copper nucleinate (29.72% copper) | 0.421 gram |
| Iron peptonate (17.5% iron) | 5.700 grams |
| Sodium citrate | 9.000 grams |
| Alcohol | 150.000 c. c. |
| Sugar | 42.500 grams |
| Glycerin | 50.000 c. c. |
| Oil of orange (sweet-italian) | 0.160 c. c. |
| Acetic ether (ethyl acetate, U. S. P.) | 0.160 c. c. |
| Vanillin | 0.020 gram |
| Distilled water to make | 1000.000 c. c. |

Alcoholic strength above solution, 14.25% (theoretical).

Maximum dose: metric, 8 c. c.—Apothecaries, 2 fluidrachms.

One maximum dose contains about:

0.001 grams copper or 0.0033 grams copper nucleinate.

0.008 grams iron or 0.0456 grams iron peptonate.

Daily dosage recommended:

From 1 to 2 teaspoonfuls, in a wine-glassful of milk three times daily just before meals.

Procedure for making solution

1. Dissolve the copper nucleinate and sodium citrate in 500 c. c. distilled water by vigorous stirring. When copper is in solution add the iron peptonate and stir until dissolved.
2. Dissolve the vanillin, oil of orange and acetic ether in the alcohol and add this solution to the first with stirring.
3. Add the glycerin and sugar and stir until dissolved.
4. Make up to proper volume with distilled water.

Solution of copper caseinate and iron peptonate

Formula (1000 c. c. solution)

| | |
|---|---|
| Copper caseinate (4.87% copper) | 2.565 grams |
| Iron peptonate (17.5% iron) | 5.700 grams |
| Sodium citrate | 9.000 grams |
| Alcohol | 150.000 c. c. |
| Sugar | 42.500 grams |
| Glycerin | 50.000 c. c. |
| Oil of orange (sweet-italian) | 0.160 c. c. |
| Acetic ether (ethyl acetate, U. S. P.) | 0.160 c. c. |
| Vanallin | 0.020 grams |
| Distilled water to make | 1000.000 c. c. |

Alcoholic strength above solution, 14.25% (theoretical).

Maximum dose: metric, 8 c. c.—Apothecaries, 2 fluidrachms.

One maximum dose contains about:

0.001 grams copper or 0.0205 grams copper caseinate.

0.008 grams iron or 0.0456 grams iron peptonate.

Daily dosage recommended:

From 1 to 2 teaspoonfuls in a wine-glassful of milk three times daily just before meals.

Procedure for making solution

1. Dissolve the copper caseinate and sodium citrate in 500 c. c. distilled water by vigorous stirring. When copper is in solution add the iron peptonate and stir until dissolved.
2. Dissolve the vanillin, oil of orange and acetic ether in the alcohol and add this solution to the first with stirring.
3. Add the glycerin and sugar and stir until dissolved.
4. Make up to the proper volume with distilled water.

I claim:

1. A medicinal preparation for the treatment of anemia comprising as its principal ingredients a proteid of iron and a proteid of copper.
2. A medicinal preparation for the treatment of anemia, comprising as its principal ingredients iron nucleinate and copper nucleinate.
3. A medicinal preparation for the treatment of anemia comprising as its principal ingredients iron peptonate and copper nucleinate.
4. A medicinal preparation for the treatment of anemia comprising as its principal ingredients iron peptonate and copper caseinate.

In testimony whereof I have affixed my signature to this specification.

WILLIAM J. HORN.